US012668146B2

(12) United States Patent
Okubo

(10) Patent No.: US 12,668,146 B2
(45) Date of Patent: Jun. 30, 2026

(54) SUPPLYING ACCUMULATED BATTERY POWER FROM A VEHICLE TO THE POWER SYSTEM

(71) Applicant: SUBARU CORPORATION, Tokyo (JP)

(72) Inventor: Yusuke Okubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 830 days.

(21) Appl. No.: 17/870,507

(22) Filed: Jul. 21, 2022

(65) Prior Publication Data

US 2023/0063011 A1     Mar. 2, 2023

(30) Foreign Application Priority Data

Aug. 31, 2021     (JP) ................................. 2021-140889

(51) Int. Cl.
*B60L 53/62*          (2019.01)
*B60L 53/66*          (2019.01)
*B60L 58/15*          (2019.01)

(52) U.S. Cl.
CPC ............... *B60L 53/62* (2019.02); *B60L 53/66* (2019.02); *B60L 58/15* (2019.02); *B60L 2240/54* (2013.01); *B60L 2240/80* (2013.01)

(58) Field of Classification Search
CPC .......... B60L 53/62; B60L 53/66; B60L 58/15; B60L 2240/54; B60L 2240/80; B60L 58/16; B60L 58/12; B60L 11/18; H01M 10/48; H02J 7/36; G01R 31/36; Y02T 10/70

USPC .......................................................... 320/109
See application file for complete search history.

(56) References Cited

U.S. PATENT DOCUMENTS

| | | | | | |
|---|---|---|---|---|---|
| 5,658,682 | A | * | 8/1997 | Usuda | H01M 10/48 |
| | | | | | 429/93 |
| 6,107,779 | A | * | 8/2000 | Hara | G01R 31/3832 |
| | | | | | 320/132 |
| 6,879,888 | B2 | * | 4/2005 | Ochiai | B60L 50/16 |
| | | | | | 290/40 C |
| 6,924,621 | B2 | * | 8/2005 | Jabaji | H02J 7/1492 |
| | | | | | 320/117 |
| 7,256,516 | B2 | * | 8/2007 | Buchanan | H01M 10/441 |
| | | | | | 307/62 |

(Continued)

FOREIGN PATENT DOCUMENTS

JP          6060956 B2     1/2017

*Primary Examiner* — Drew A Dunn
*Assistant Examiner* — Frank Alexis Silva
(74) *Attorney, Agent, or Firm* — McGinn IP Law Group, PLLC

(57)          ABSTRACT

A vehicle includes a charging port, an in-vehicle battery, a control apparatus comprising one or more processors. The control apparatus is configured to control power supply in response to reception of a power supply request. The one or more processors perform setting a charge start time, starting the power supply to the power system if the power supply request is received before the charge start time, controlling the power of the power supply so that State of Charge in the in-vehicle battery becomes lower than or equal to a predetermined value before the charge start time, and controlling the power of the power supply so as to be lower than or equal to a predetermined upper limit at which increase in deterioration in the in-vehicle battery due to the power supply can be suppressed.

6 Claims, 9 Drawing Sheets

(56) References Cited

U.S. PATENT DOCUMENTS

| | | | | |
|---|---|---|---|---|
| 7,321,220 B2* | 1/2008 | Plett | G01R 31/3648 | 324/426 |
| 7,612,532 B2* | 11/2009 | Verbrugge | H01M 10/48 | 320/132 |
| 7,746,026 B2* | 6/2010 | Koziara | B60L 3/0046 | 324/426 |
| 8,004,239 B2* | 8/2011 | Kawahara | H02J 7/007194 | 320/128 |
| 8,019,483 B2* | 9/2011 | Keefe | B60L 53/63 | 700/286 |
| 8,159,188 B2* | 4/2012 | Anderson | H01M 10/44 | 320/132 |
| 8,170,818 B2* | 5/2012 | Lin | G01R 31/367 | 702/63 |
| 8,336,651 B2* | 12/2012 | Nishi | H02J 7/00302 | 320/136 |
| 8,400,112 B2* | 3/2013 | Anderson | H01M 10/48 | 320/132 |
| 8,436,585 B2* | 5/2013 | Yano | H02J 7/0068 | 320/132 |
| 8,670,885 B2* | 3/2014 | Gilman | B60L 58/12 | 340/995.14 |
| 8,676,419 B2* | 3/2014 | Blakemore | B60L 58/22 | 320/133 |
| 8,823,325 B2* | 9/2014 | Ling | G01R 31/3835 | 320/132 |
| 8,912,753 B2* | 12/2014 | Pudar | H02J 13/1321 | 320/109 |
| 8,996,183 B2* | 3/2015 | Forbes, Jr. | H02J 3/14 | 700/291 |
| 9,000,712 B2* | 4/2015 | Abe | H02J 7/007194 | 320/101 |
| 9,073,444 B2* | 7/2015 | Ito | B60L 53/62 | |
| 9,097,773 B2* | 8/2015 | Joe | H01M 10/48 | |
| 9,132,745 B1* | 9/2015 | Lee | B60L 50/66 | |
| 9,153,847 B2* | 10/2015 | Harty | B60L 53/53 | |
| 9,197,064 B2* | 11/2015 | Sato | H02J 13/00028 | |
| 9,209,494 B2* | 12/2015 | Kiesel | H01M 10/42 | |
| 9,225,188 B2* | 12/2015 | Suyama | B60L 53/63 | |
| 9,252,620 B2* | 2/2016 | Yamauchi | H02J 7/0068 | |
| 9,325,181 B2* | 4/2016 | Momcilovich | B60L 50/61 | |
| 9,331,511 B2* | 5/2016 | Becker | H02J 3/32 | |
| 9,348,381 B2* | 5/2016 | Khoo | B60L 53/14 | |
| 9,379,559 B2* | 6/2016 | O'Connell | G01C 21/3469 | |
| 9,428,173 B2* | 8/2016 | Stefanon | B60L 58/15 | |
| 9,442,165 B2* | 9/2016 | Asghari | H02J 7/34 | |
| 9,457,680 B2* | 10/2016 | Shinzaki | B60L 58/13 | |
| 9,457,682 B2* | 10/2016 | Twarog | H01M 10/443 | |
| 9,461,494 B2* | 10/2016 | Ito | B60L 3/04 | |
| 9,505,308 B2* | 11/2016 | Kyoung | B60L 58/13 | |
| 9,583,796 B2* | 2/2017 | Saha | G01R 31/392 | |
| 9,636,992 B2* | 5/2017 | Biderman | A61B 5/6893 | |
| 9,636,993 B2* | 5/2017 | Biderman | A61B 5/24 | |
| 9,663,098 B2* | 5/2017 | Kodawara | B60L 58/26 | |
| 9,669,699 B2* | 6/2017 | Biderman | A61B 5/7275 | |
| 9,669,700 B2* | 6/2017 | Biderman | B60K 7/00 | |
| 9,682,637 B2* | 6/2017 | Shimizu | B60L 53/665 | |
| 9,701,190 B2* | 7/2017 | Biderman | G05D 1/0285 | |
| 9,720,478 B2* | 8/2017 | Hanafusa | H02J 13/00022 | |
| 9,738,151 B2* | 8/2017 | Biderman | A63B 21/0058 | |
| 9,796,288 B2* | 10/2017 | Mensah-Brown | H02J 7/34 | |
| 9,815,363 B2* | 11/2017 | Biderman | B60K 7/00 | |
| 9,827,870 B2* | 11/2017 | Ahn | B60L 50/52 | |
| 9,878,608 B2* | 1/2018 | Biderman | B60L 53/00 | |
| 9,881,259 B2* | 1/2018 | Forbes, Jr. | H02J 3/003 | |
| 9,884,548 B2* | 2/2018 | Biderman | G01C 21/3632 | |
| 9,902,252 B2* | 2/2018 | Biderman | B60C 5/005 | |
| 9,931,924 B2* | 4/2018 | Biderman | G07C 5/008 | |
| 9,937,783 B2* | 4/2018 | Biderman | A63B 21/22 | |
| 9,944,167 B2* | 4/2018 | Biderman | B60L 53/00 | |
| 10,012,703 B2* | 7/2018 | Gilbert | B60L 50/64 | |
| 10,014,702 B2* | 7/2018 | Vogel | G01R 31/367 | |
| 10,106,026 B2* | 10/2018 | Biderman | B60Q 9/00 | |
| 10,164,448 B2* | 12/2018 | Tanaka | H02J 7/0013 | |
| 10,166,856 B2* | 1/2019 | Biderman | B60L 15/2009 | |
| 10,179,507 B2* | 1/2019 | Terayama | B60L 15/2045 | |
| 10,259,311 B2* | 4/2019 | Biderman | B62B 5/004 | |
| 10,297,877 B2* | 5/2019 | Kagawa | H02J 7/0048 | |
| 10,308,065 B2* | 6/2019 | Biderman | B62M 6/80 | |
| 10,353,008 B2* | 7/2019 | Benosman | G01R 31/367 | |
| 10,414,283 B2* | 9/2019 | Kudo | B60L 55/00 | |
| 10,434,892 B2* | 10/2019 | Ko | B60L 53/66 | |
| 10,513,200 B2* | 12/2019 | Kim | B60L 58/12 | |
| 10,538,174 B2* | 1/2020 | Sun | B60L 58/12 | |
| 10,543,741 B2* | 1/2020 | Biderman | G08G 1/202 | |
| 10,543,750 B2* | 1/2020 | Ota | B60L 8/003 | |
| 10,753,977 B2* | 8/2020 | Cha | H01M 10/48 | |
| 10,884,475 B1* | 1/2021 | Wang | G06F 1/3296 | |
| 10,896,474 B2* | 1/2021 | Biderman | H04L 67/12 | |
| 10,933,763 B2* | 3/2021 | Hall | B60L 53/62 | |
| 11,001,154 B2* | 5/2021 | Hita | B60W 20/13 | |
| 11,091,024 B2* | 8/2021 | Biderman | A63B 22/0605 | |
| 11,125,707 B1* | 9/2021 | Fasching | G01R 31/389 | |
| 11,305,667 B2* | 4/2022 | Ichikawa | B60L 55/00 | |
| 11,332,017 B2* | 5/2022 | Legnedahl | B60L 58/10 | |
| 11,361,392 B2* | 6/2022 | Bhattarai | H02J 3/32 | |
| 11,366,172 B2* | 6/2022 | Choi | G01R 31/389 | |
| 11,394,060 B2* | 7/2022 | Shimura | H01M 10/0525 | |
| 11,447,026 B2* | 9/2022 | Lee | B60L 53/62 | |
| 11,524,599 B2* | 12/2022 | Ogawa | B60L 55/00 | |
| 11,535,118 B2* | 12/2022 | Moriya | H02J 7/007186 | |
| 11,605,965 B2* | 3/2023 | Lee | H02J 7/971 | |
| 11,642,977 B2* | 5/2023 | Bhargava | B60L 53/63 | 320/109 |
| 11,691,525 B2* | 7/2023 | Lee | B60L 53/20 | 320/109 |
| 11,692,956 B2* | 7/2023 | Fasching | H01M 50/204 | 324/691 |
| 11,764,426 B2* | 9/2023 | Yang | H01M 50/251 | 429/120 |
| 11,923,714 B2* | 3/2024 | Hara | H02J 7/007182 | |
| 11,926,224 B2* | 3/2024 | Bertness | B60L 1/02 | |
| 11,942,607 B2* | 3/2024 | Ingurthi | H01M 10/441 | |
| 11,967,842 B2* | 4/2024 | Khozikov | H01H 9/106 | |
| 11,970,075 B2* | 4/2024 | Bhargava | B60L 53/63 | |
| 12,046,780 B1* | 7/2024 | Leighton | H01M 8/04089 | |
| 12,103,428 B2* | 10/2024 | Byrhult | B60L 58/16 | |
| 12,119,522 B2* | 10/2024 | Park | H01M 8/04303 | |
| 12,311,801 B2* | 5/2025 | Kim | H02J 3/32 | |
| 2003/0088343 A1* | 5/2003 | Ochiai | B60L 58/26 | 903/917 |
| 2004/0130292 A1* | 7/2004 | Buchanan | B60L 53/20 | 320/116 |
| 2005/0110498 A1* | 5/2005 | Plett | G01R 31/3828 | 324/433 |
| 2006/0284600 A1* | 12/2006 | Verbrugge | G01R 31/367 | 320/132 |
| 2009/0210357 A1* | 8/2009 | Pudar | H02J 13/1321 | 705/412 |
| 2009/0313034 A1* | 12/2009 | Ferro | B60L 53/68 | 705/1.1 |
| 2009/0326749 A1* | 12/2009 | Uchida | B60L 50/61 | 320/109 |
| 2010/0000809 A1* | 1/2010 | Nishi | H01M 10/48 | 320/132 |
| 2010/0090524 A1* | 4/2010 | Obayashi | B60L 53/126 | 307/9.1 |
| 2010/0174500 A1* | 7/2010 | Plett | G01R 31/367 | 324/427 |
| 2011/0089905 A1* | 4/2011 | Yano | B60L 3/0046 | 320/132 |
| 2011/0140668 A1* | 6/2011 | Anderson | H01M 10/44 | 320/134 |
| 2011/0156657 A1* | 6/2011 | Anderson | H02J 7/0069 | 320/134 |
| 2011/0204852 A1* | 8/2011 | Saruhashi | H01M 10/441 | 320/134 |
| 2011/0278920 A1* | 11/2011 | Sakamoto | B60L 1/00 | 307/10.1 |

(56) References Cited

U.S. PATENT DOCUMENTS

| | | | |
|---|---|---|---|
| 2012/0133337 A1* | 5/2012 | Rombouts | G07F 15/006 320/155 |
| 2012/0323395 A1* | 12/2012 | Sato | H02J 13/00028 700/297 |
| 2012/0326655 A1* | 12/2012 | Nomura | B60L 58/13 320/107 |
| 2012/0326667 A1* | 12/2012 | Ito | H02J 7/0068 320/109 |
| 2013/0030618 A1* | 1/2013 | Blakemore | H02J 7/0016 701/22 |
| 2013/0076124 A1* | 3/2013 | Yagura | B60L 1/12 307/9.1 |
| 2013/0082519 A1* | 4/2013 | Nagakura | B60L 53/14 307/9.1 |
| 2013/0162218 A1* | 6/2013 | Kang | H02J 7/0068 320/134 |
| 2013/0184910 A1* | 7/2013 | Sujan | B60K 6/387 180/65.265 |
| 2014/0089692 A1* | 3/2014 | Hanafusa | H02J 13/00002 713/310 |
| 2014/0132214 A1* | 5/2014 | Katanoda | B60L 58/15 320/109 |
| 2014/0139191 A1* | 5/2014 | Asghari | H01M 10/48 320/134 |
| 2014/0159672 A1* | 6/2014 | Blakemore | B60L 53/14 320/136 |
| 2014/0232356 A1* | 8/2014 | Kyoung | B60L 58/16 320/162 |
| 2014/0236379 A1* | 8/2014 | Masuda | B60L 53/20 700/297 |
| 2014/0239894 A1* | 8/2014 | Mitsutani | B60L 53/14 320/109 |
| 2015/0054466 A1* | 2/2015 | Kinomura | B60L 53/68 320/134 |
| 2015/0066407 A1* | 3/2015 | Joe | G01R 31/392 702/63 |
| 2015/0066837 A1* | 3/2015 | Twarog | B60L 58/12 706/58 |
| 2015/0112526 A1* | 4/2015 | Martin | B60W 20/12 701/22 |
| 2015/0115995 A1* | 4/2015 | Gilbert | G01R 31/42 324/764.01 |
| 2015/0165918 A1* | 6/2015 | Shizuno | B60L 53/68 320/109 |
| 2015/0175020 A1* | 6/2015 | Kim | B60L 58/12 320/109 |
| 2015/0232081 A1* | 8/2015 | Slosarczyk | G01R 31/3648 701/22 |
| 2015/0251547 A1* | 9/2015 | Nonomura | B60L 58/15 320/109 |
| 2015/0258907 A1* | 9/2015 | Lee | B60L 58/12 903/903 |
| 2015/0283912 A1* | 10/2015 | Shimizu | B60L 55/00 320/157 |
| 2015/0318727 A1* | 11/2015 | Vogel | H02J 7/00306 320/107 |
| 2016/0009169 A1* | 1/2016 | Biderman | A61B 5/0002 701/22 |
| 2016/0009179 A1* | 1/2016 | Biderman | A61B 5/6893 701/29.2 |
| 2016/0009181 A1* | 1/2016 | Biderman | B60K 7/0007 701/22 |
| 2016/0009223 A1* | 1/2016 | Biderman | H02P 3/06 701/22 |
| 2016/0009293 A1* | 1/2016 | Biderman | G05D 1/0285 701/22 |
| 2016/0009334 A1* | 1/2016 | Biderman | A61B 5/24 701/2 |
| 2016/0009335 A1* | 1/2016 | Biderman | B60R 16/02 701/22 |
| 2016/0009336 A1* | 1/2016 | Biderman | B60L 15/2009 701/22 |
| 2016/0009337 A1* | 1/2016 | Biderman | B60L 15/20 701/2 |
| 2016/0009338 A1* | 1/2016 | Biderman | A61B 5/6893 701/22 |
| 2016/0009339 A1* | 1/2016 | Biderman | G07C 5/006 701/22 |
| 2016/0011003 A1* | 1/2016 | Biderman | G07C 5/02 701/538 |
| 2016/0011598 A1* | 1/2016 | Biderman | H04L 67/12 701/22 |
| 2016/0011599 A1* | 1/2016 | Biderman | G08G 1/0129 701/22 |
| 2016/0012652 A1* | 1/2016 | Biderman | B60C 9/00 70/237 |
| 2016/0012721 A1* | 1/2016 | Biderman | B62M 25/08 701/33.4 |
| 2016/0012723 A1* | 1/2016 | Biderman | A61G 5/048 701/22 |
| 2016/0014205 A1* | 1/2016 | Biderman | G08G 1/0129 709/201 |
| 2016/0014252 A1* | 1/2016 | Biderman | A61G 5/04 701/29.2 |
| 2016/0075175 A1* | 3/2016 | Biderman | B60L 7/00 301/6.5 |
| 2016/0075177 A1* | 3/2016 | Biderman | B60L 58/21 301/6.5 |
| 2016/0075226 A1* | 3/2016 | Biderman | B60L 50/20 301/6.5 |
| 2016/0082772 A1* | 3/2016 | Biderman | B60K 7/00 301/6.5 |
| 2016/0121749 A1* | 5/2016 | Mensah-Brown | H02J 7/34 307/10.1 |
| 2016/0159236 A1* | 6/2016 | Tagome | H01M 10/448 320/109 |
| 2016/0243927 A1* | 8/2016 | Biderman | G07C 5/008 |
| 2016/0272079 A1* | 9/2016 | Quoc-Tuan | B60L 55/00 |
| 2016/0370433 A1* | 12/2016 | Chazal | G01R 31/396 |
| 2017/0001537 A1* | 1/2017 | Ahn | B60L 50/52 |
| 2017/0059662 A1* | 3/2017 | Cha | G01R 31/367 |
| 2017/0136914 A1* | 5/2017 | Drake | B60L 58/21 |
| 2017/0158078 A1* | 6/2017 | Kim | B60L 53/00 |
| 2017/0366023 A1* | 12/2017 | Tanaka | H01M 10/425 |
| 2018/0154778 A1* | 6/2018 | Ota | B60L 8/003 |
| 2018/0170207 A1* | 6/2018 | Ko | B60L 58/26 |
| 2018/0186246 A1* | 7/2018 | Kudo | B60L 55/00 |
| 2018/0272884 A1* | 9/2018 | Kojima | B60L 53/65 |
| 2018/0281616 A1* | 10/2018 | Kim | B60L 58/20 |
| 2018/0345798 A1* | 12/2018 | Sakakibara | B60L 1/00 |
| 2018/0347535 A1* | 12/2018 | Chen | F02N 11/0825 |
| 2019/0039467 A1* | 2/2019 | Hortop | H02J 7/0071 |
| 2019/0160962 A1* | 5/2019 | Ichikawa | H02J 7/35 |
| 2019/0178946 A1* | 6/2019 | Han | H01M 10/48 |
| 2019/0210476 A1* | 7/2019 | Hase | B60L 53/12 |
| 2019/0211528 A1* | 7/2019 | Hita | H01M 10/443 |
| 2019/0275900 A1* | 9/2019 | Niimi | B60L 58/18 |
| 2019/0283614 A1* | 9/2019 | Nakamoto | B60L 58/13 |
| 2019/0366874 A1* | 12/2019 | Bryngelsson | B60L 58/16 |
| 2020/0009980 A1* | 1/2020 | Ishida | B60L 53/14 |
| 2020/0036050 A1* | 1/2020 | Shimura | H01M 10/425 |
| 2020/0047634 A1* | 2/2020 | Akaishi | B60L 53/62 |
| 2020/0086748 A1* | 3/2020 | Bolger | H02J 7/00 |
| 2020/0101861 A1* | 4/2020 | Ichikawa | B60L 53/62 |
| 2020/0114753 A1* | 4/2020 | Biderman | B60R 16/02 |
| 2020/0139805 A1* | 5/2020 | Biderman | A63B 21/0058 |
| 2020/0153263 A1* | 5/2020 | Akaishi | H02J 7/007182 |
| 2020/0215930 A1* | 7/2020 | Izumi | B60R 16/02 |
| 2020/0266649 A1* | 8/2020 | Lee | H02J 7/971 |
| 2020/0307391 A1* | 10/2020 | Moriya | B60L 1/006 |
| 2020/0307412 A1* | 10/2020 | Moriya | B60L 58/13 |
| 2020/0376978 A1* | 12/2020 | Chen | B60L 58/16 |
| 2020/0384887 A1* | 12/2020 | Yokoyama | B60L 58/10 |
| 2021/0009004 A1* | 1/2021 | Tsutsumi | B60L 53/62 |
| 2021/0011089 A1* | 1/2021 | Choi | H01M 10/48 |
| 2021/0046887 A1* | 2/2021 | Yamashita | B60L 50/40 |
| 2021/0061129 A1* | 3/2021 | Nakamura | B60L 58/27 |
| 2021/0107373 A1* | 4/2021 | Nakamura | B60L 53/14 |
| 2021/0111422 A1* | 4/2021 | Park | H01M 8/04955 |
| 2021/0142349 A1* | 5/2021 | Muro | G06Q 30/04 |

(56) References Cited

U.S. PATENT DOCUMENTS

| | | | |
|---|---|---|---|
| 2021/0218250 A1* | 7/2021 | Statman | H01M 10/425 |
| 2021/0300184 A1* | 9/2021 | Homma | H01M 10/44 |
| 2021/0305635 A1* | 9/2021 | Homma | B60L 1/003 |
| 2021/0316630 A1* | 10/2021 | Lee | B60L 53/62 |
| 2021/0320503 A1* | 10/2021 | Kitaoka | B60L 53/63 |
| 2021/0339620 A1* | 11/2021 | Biderman | A63B 21/0058 |
| 2021/0358231 A1* | 11/2021 | Kazuno | B60L 58/13 |
| 2022/0009372 A1* | 1/2022 | Bhargava | B60L 53/665 |
| 2022/0016993 A1* | 1/2022 | Kawahara | H02J 7/007192 |
| 2022/0057350 A1* | 2/2022 | Fasching | H01M 50/204 |
| 2022/0060029 A1* | 2/2022 | Syouda | H02J 7/0016 |
| 2022/0069365 A1* | 3/2022 | Ingurthi | H02J 7/007192 |
| 2022/0069382 A1* | 3/2022 | Yang | H01M 10/48 |
| 2022/0105824 A1* | 4/2022 | Zhou | B60L 53/20 |
| 2022/0161682 A1* | 5/2022 | Byrhult | B60L 58/25 |
| 2022/0207578 A1* | 6/2022 | Misawa | G06Q 30/0284 |
| 2022/0234467 A1* | 7/2022 | Nakamura | H02J 7/007182 |
| 2022/0242263 A1* | 8/2022 | Hirose | B60L 53/51 |
| 2022/0250498 A1* | 8/2022 | Okada | B60L 53/18 |
| 2022/0255334 A1* | 8/2022 | Fujino | B60L 53/62 |
| 2022/0260639 A1* | 8/2022 | Thompson | G06F 1/263 |
| 2022/0355700 A1* | 11/2022 | Ishii | H02J 7/00716 |
| 2022/0407317 A1* | 12/2022 | Matsumura | H02J 7/00714 |
| 2022/0407329 A1* | 12/2022 | Tu | H02J 7/92 |
| 2023/0022655 A1* | 1/2023 | Im | B60L 58/18 |
| 2023/0101550 A1* | 3/2023 | Bentzion | B60L 50/60 |
| | | | 320/109 |
| 2023/0104930 A1* | 4/2023 | Froeschl | H01M 10/46 |
| | | | 320/108 |
| 2023/0158915 A1* | 5/2023 | Zhou | B60L 53/62 |
| | | | 320/109 |
| 2023/0219445 A1* | 7/2023 | Bhargava | H02J 3/14 |
| | | | 320/109 |
| 2023/0280295 A1* | 9/2023 | Fasching | G01R 31/389 |
| | | | 324/691 |
| 2023/0387700 A1* | 11/2023 | Singer | H01M 10/441 |
| 2024/0339640 A1* | 10/2024 | Leighton | B60L 58/30 |
| 2024/0429414 A1* | 12/2024 | Park | H01M 8/04626 |

* cited by examiner

SUPPLYING ACCUMULATED BATTERY POWER FROM A VEHICLE TO THE POWER SYSTEM

CROSS-REFERENCE TO RELATED APPLICATIONS

The present application claims priority from Japanese Patent Application No. 2021-140889 filed on Aug. 31, 2021, the entire contents of which are hereby incorporated by reference.

BACKGROUND

The disclosure relates to supplying accumulated battery power from a vehicle to the power system.

For example, Japanese Patent No. 6060956 discloses a vehicle capable of supplying power accumulated in an in-vehicle battery to a power system. With this technique, charge from the power system to the in-vehicle battery is performed at night and power supply from the in-vehicle battery to the power system is performed during the day.

SUMMARY

An aspect of the disclosure provides a vehicle including a charging port, an in-vehicle battery, and a control apparatus. The charging port is configured to be electrically connectable to a power system. The in-vehicle battery is configured to be electrically connectable to the charging port. The control apparatus includes one or more processors and one or more memories configured to be connected to the processors. The control apparatus is configured to control charge of the in-vehicle battery with power supplied from the power system. The control apparatus is configured to control power supply in response to reception of a power supply request requesting the power supply to supply power accumulated in the in-vehicle battery to the power system. The one or more processors perform, in cooperation with a program included in the one or more memories, a process including setting a charge start time at which start of the charge is scheduled based on a time at which termination of the charge of the in-vehicle battery is scheduled, starting the power supply to the power system if the power supply request is received before the charge start time, controlling the power of the power supply so that state of charge in the in-vehicle battery becomes a value lower than or equal to a predetermined value before the charge start time, and controlling the power of the power supply so as to be lower than or equal to a predetermined upper limit at which increase in deterioration in the in-vehicle battery due to the power supply can be suppressed.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

A power system desirably has large power that is supplied from an in-vehicle battery. However, there is a room for improvement in that increase in the power of the power supply may increase deterioration in the in-vehicle battery.

In order to achieve the improvement, it is desirable to provide a vehicle capable of supplying power accumulated in an in-vehicle battery to a power system while suppressing increase in deterioration in the in-vehicle battery.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
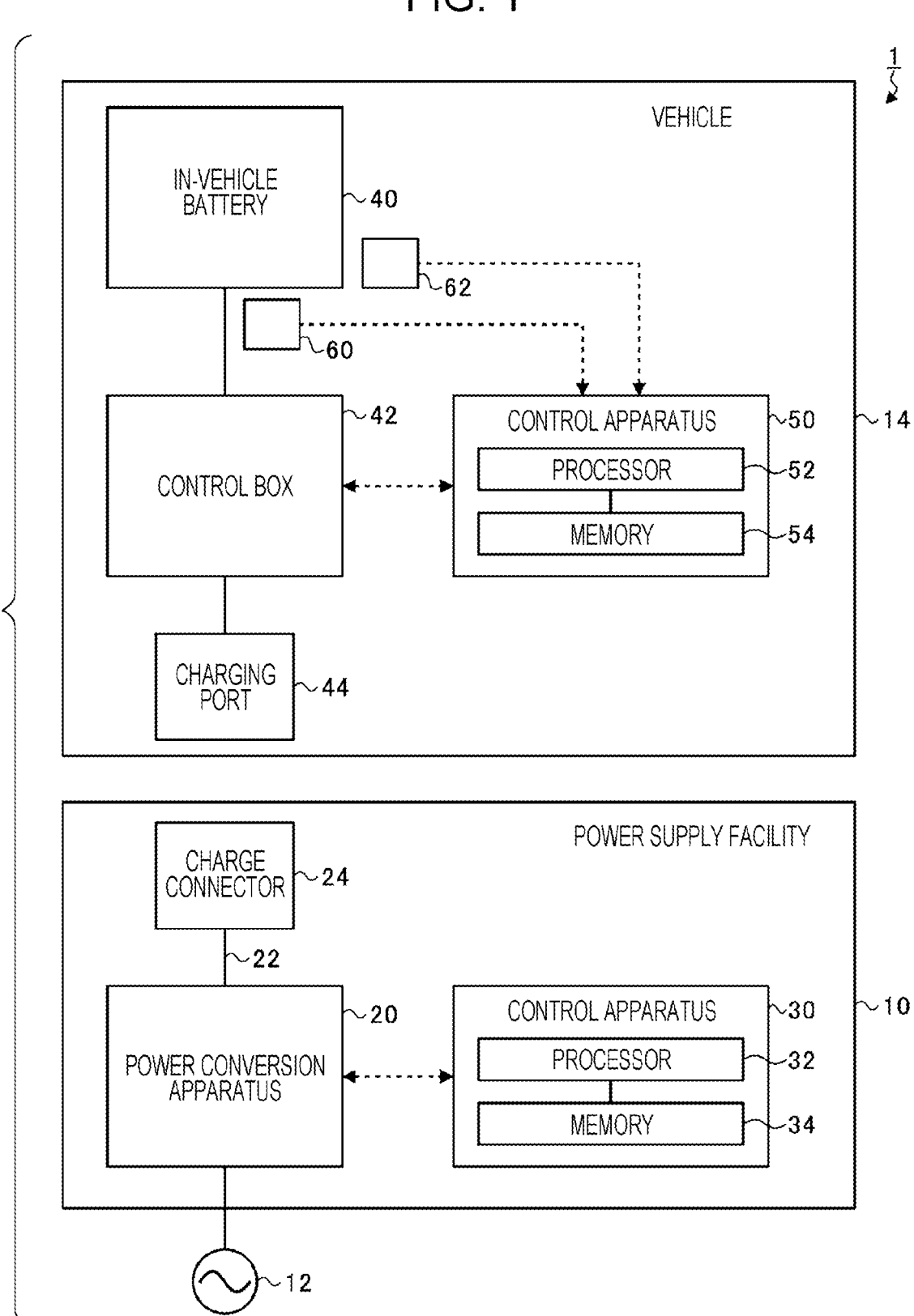
FIG. 1 is a schematic diagram illustrating the configuration of a power system according to an embodiment.

FIG. 1 is a schematic diagram illustrating the configuration of a power system 1 according to an embodiment. The power system 1 includes a power supply facility 10, a power system 12, and a vehicle 14. The vehicle 14 is an electric automobile or a hybrid electric vehicle.

The power supply facility 10 includes a power conversion apparatus 20, a charge cable 22, and a charge connector 24. The power conversion apparatus 20 is electrically connected to the power system 12. Among two ends of the charge cable 22, a first end is connected to the power conversion apparatus 20. The charge connector 24 is provided at a second end, among the two ends of the charge cable 22. The charge connector 24 is connectable to a charging port 44 of the vehicle 14. This will be described below.

The power conversion apparatus 20 converts power supplied from the power system 12 and supplies the power subjected to the conversion to the charge connector 24. In a state in which the charge connector 24 is connected to the charging port 44, the power conversion apparatus 20 is capable of supplying the power to the vehicle 14 via the charge connector 24. In addition, in the state in which the charge connector 24 is connected to the charging port 44, the power conversion apparatus 20 is capable of receiving power from the vehicle 14 via the charge connector 24. The power conversion apparatus 20 is capable of converting power received from the vehicle 14 and supplying the power subjected to the conversion to the power system 12.

The power supply facility 10 includes a control apparatus 30. The control apparatus 30 includes one or more processors 32 and one or more memories 34 connected to the processors 32. The memory 34 includes a read only memory (ROM) storing programs and so on and a random access memory (RAM) serving as a working area. The processor 32 in the control apparatus 30 controls the entire power supply facility 10 in cooperation with the programs in the memory 34. For example, the processor 32 performs processes concerning exchange of power between the power system 12 and the vehicle 14. The control apparatus 30 is capable of communicating with the vehicle 14 via the charge cable 22 and the charge connector 24.

The vehicle 14 includes an in-vehicle battery 40. The in-vehicle battery 40 is, for example, a secondary battery such as a lithium-ion battery. The in-vehicle battery 40 supplies power to a motor generator, which is a drive source of the vehicle 14. The motor generator drives the wheels of the vehicle 14. In addition, the motor generator generates power while the vehicle 14 is decelerating. The in-vehicle battery 40 is charged with the power generated by the motor generator.

The vehicle 14 includes a control BOX 42 and the charging port 44. The charging port 44 is connectable to the charge connector 24. The control BOX 42 includes, for example, a switch that turns on and off electrical connection between the charging port 44 and the in-vehicle battery 40. When the charge connector 24 is connected to the charging port 44, the control BOX 42 is electrically connected to the power system 12 via the power supply facility 10.

In the state in which the charge connector 24 is connected to the charging port 44, the vehicle 14 is capable of receiving power from the power system 12 via the power supply facility 10. The control apparatus 30 in the power supply facility 10 controls the power conversion apparatus 20 to supply power subjected to conversion to the charging port 44. When the control BOX 42 is in an on state, the power supplied from the power supply facility 10 to the charging port 44 is supplied to the in-vehicle battery 40. In other words, the power conversion apparatus 20 is capable of charging the in-vehicle battery 40 with the power supplied from the power system 12. For example, the power conversion apparatus 20 controls the voltage at a terminal connected to the in-vehicle battery 40 so as to be higher than the voltage at an input-output terminal of the in-vehicle battery 40. This causes current to flow from the power conversion apparatus 20 to the in-vehicle battery 40. As a result, the power supplied to the control BOX 42 via the power supply facility 10 is supplied to the in-vehicle battery 40.

When the charge connector 24 is connected to the charging port 44 and the control BOX 42 is in the on state, the power conversion apparatus 20 is capable of supplying power accumulated in the in-vehicle battery 40 to the power system 12. For example, the power conversion apparatus 20 controls the voltage at the terminal connected to the in-vehicle battery 40 so as to be lower than the voltage at the input-output terminal of the in-vehicle battery 40. This causes current to flow from in-vehicle battery 40 to the power conversion apparatus 20. As a result, the power supplied from the in-vehicle battery 40 to the power conversion apparatus 20 is supplied to the power system 12.

The vehicle 14 includes a control apparatus 50. The control apparatus 50 includes one or more processors 52 and one or more memories 54 connected to the processors 52. The memory 54 includes a read only memory (ROM) storing programs and so on and a random access memory (RAM) serving as a working area. The processor 52 in the control apparatus 50 controls the entire vehicle 14 in cooperation with the programs in the memory 54. For example, the processor 52 performs processes concerning charge of the in-vehicle battery 40 with the power supplied from the power system 12 and power supply of the power accumulated in the in-vehicle battery 40 to the power system 12. The processes performed by the processor 52 will be described in detail below. The control apparatus 50 is capable of communicating with the power supply facility 10 via the charging port 44. The control apparatus 50 is capable of communicating with the control apparatus 30 in the power supply facility 10 to indirectly control the power conversion apparatus 20 via the control apparatus 30. In other words, the control apparatus 50 is capable of substantially controlling the charge of the in-vehicle battery 40 and the power supply to the power system 12. In addition, the control apparatus 50 is capable of controlling turning on and off of the control BOX 42.

The vehicle 14 includes a voltage sensor 60 and a temperature sensor 62. The voltage sensor 60 detects the voltage at the input-output terminal of the in-vehicle battery 40. The temperature sensor 62 detects the temperature of the in-vehicle battery 40.

Figure 2:
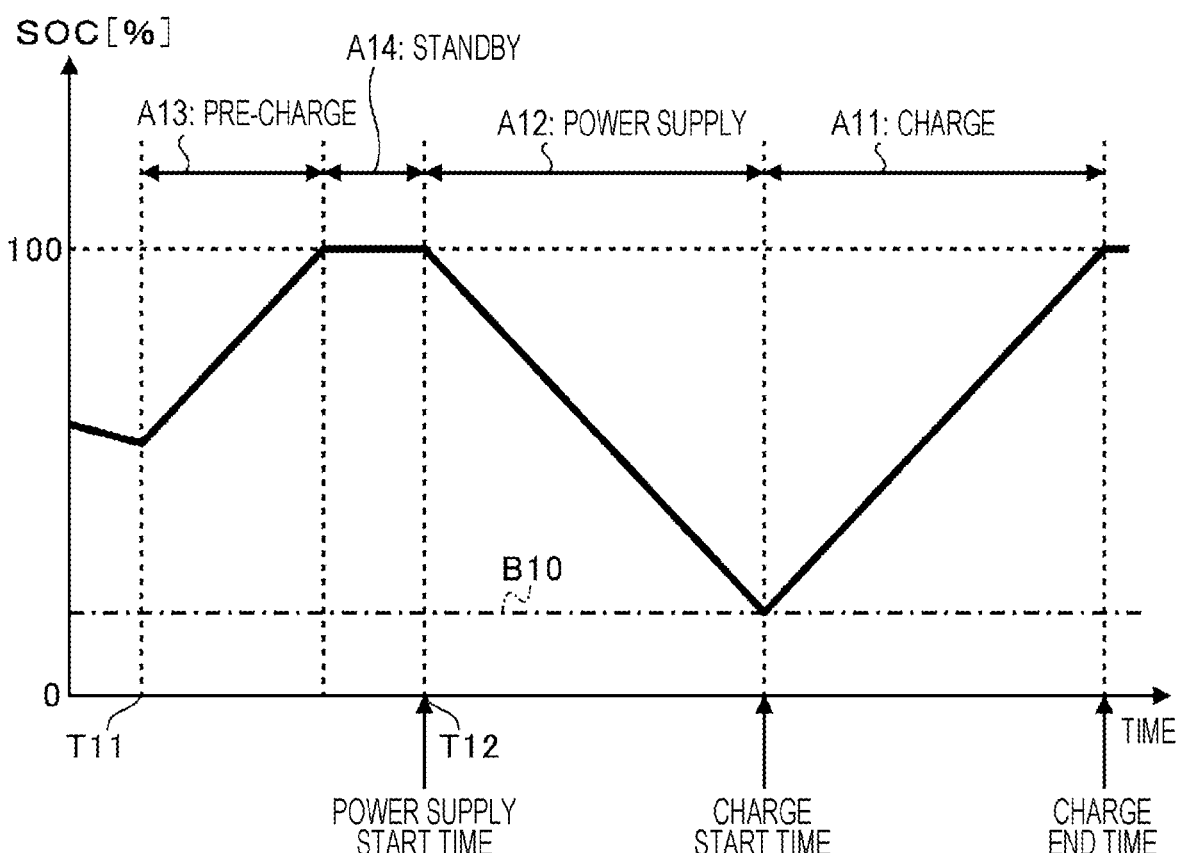
FIG. 2 is a graph for schematically describing the operation of a control apparatus.

FIG. 2 is a graph for schematically describing the operation of the control apparatus 50. FIG. 2 indicates an example of time transition of State of Charge (SOC) in the in-vehicle battery 40. The SOC is an index indicating the electric charge state in the in-vehicle battery 40. For example, the SOC is an index indicating the current charge capacity in percentage with respect to the full charge capacity, which is 100%. The SOC is increased in response to charge of the in-vehicle battery 40 and is decreased in response to discharge from the in-vehicle battery 40.

In the example in FIG. 2, it is assumed that an owner of the vehicle 14 connects the charge connector 24 to the charging port 44 at a time T11. At this time, the owner of the vehicle 14 inputs a charge end time into the vehicle 14. Alternatively, the control apparatus 50 estimates the charge end time based on the past charge history in the vehicle 14 to set the estimated charge end time. The charge end time indicates the time at which termination of the charge of the in-vehicle battery 40 with the power supplied from the power system 12 via the power supply facility 10 is scheduled.

The control apparatus 50 performs the charge so that the SOC in the in-vehicle battery 40 becomes higher than or equal to predetermined SOC before the charge end time, as indicated by an arrow A11. Although the predetermined SOC is set to, for example, 100%, the predetermined SOC is not limited to this example and may be set to any value.

In order to perform the charge in the above manner, the processor 52 in the control apparatus 50 performs a process to set a charge start time based on the charge end time. The charge start time is the time at which start of the charge of the in-vehicle battery 40 with the power supplied from the power system 12 is scheduled. The control apparatus 50 starts the charge of the in-vehicle battery 40 when the current time reaches the charge start time. The control apparatus 50 may be restrict the power of the charge so as to be lower than or equal to a predetermined upper limit.

A control apparatus in the power system 12 transmits a power supply request to the power supply facility 10 upon increase in demand for power in the power system 12. The power supply request indicates information that requests the power supply from the in-vehicle battery 40 in the vehicle 14 to the power system 12. The control apparatus 30 in the power supply facility 10 transmits the received power supply request to the vehicle 14 when the charge connector 24 is connected to the charging port 44. The control apparatus 50 in the vehicle 14 is capable of receiving the power supply request via the power supply facility 10.

Upon reception of the power supply request, the processor 52 in the control apparatus 50 performs a process to start the power supply to the power system 12 if the power supply request is received before the charge start time, as indicated by an arrow A12. The control apparatus 50 does not perform the power supply based on the power supply request if the power supply request is received during the charge indicated by the arrow A11.

In the example in FIG. 2, it is assumed that the SOC in the in-vehicle battery 40 becomes 100% at a time T12 before the charge start time that is set. It is also assumed that the control apparatus 50 receives the power supply request at the time T12. It is assumed that the SOC in the in-vehicle battery 40 at the reception time of the power supply request is higher than or equal to a power supply stop SOC indicated by an alternate long and short dash line B10 in FIG. 2. The power supply stop SOC is a predetermined threshold value on which determination of whether the power supply is stopped is based. The power supply stop SOC is set to a relatively low value, as illustrated by the alternate long and short dash line B10 in FIG. 2. Although the power supply stop SOC is set to, for example, 20%, the power supply stop SOC may be set to any value.

Upon reception of the power supply request, the control apparatus 50 starts the power supply if the SOC in the in-vehicle battery 40 at the reception time of the power supply request is higher than or equal to the power supply stop SOC. Accordingly, the reception time of the power supply request corresponds to a power supply start time. The power supply start time indicates the time at which the power supply from the in-vehicle battery 40 to the power system 12 is started. The power accumulated in the in-vehicle battery 40 is supplied to the power system 12 via the power supply facility 10. Such power supply causes the vehicle 14 to function as part of a power supply source in the power system 12 in an embodiment of the disclosure.

The processor 52 in the control apparatus 50 performs a process to control the power of the power supply so that the SOC in the in-vehicle battery 40 becomes lower than or equal to the power supply stop SOC before the current time reaches the charge start time.

When the SOC in the in-vehicle battery 40 becomes lower than or equal to the power supply stop SOC as the result of the power supply, the control apparatus 50 stops the power supply from the in-vehicle battery 40. An example is indicated in FIG. 2 in which the current time reaches the charge start time immediately after the power supply is stopped.

Performing the power supply before the current time reaches the charge start time enables the control apparatus 50 to achieve both the charge of the in-vehicle battery 40 and the causing of the vehicle 14 to function as part of the power supply source in the power system 12. In addition, performing the power supply so that the SOC becomes lower than or equal to the power supply stop SOC enables the control apparatus 50 to increase the total of the power to be supplied from the vehicle 14 to the power system 12 as much as possible.

It is desirable for the power system 12 to receive large power as the power supply from the in-vehicle battery 40. However, there is a room for improvement in that the increase in the power of the power supply may increase deterioration in the in-vehicle battery 40.

In order to achieve the improvement, the processor 52 in the control apparatus 50 performs a process to control the power of the power supply so as to be lower than or equal to a predetermined upper limit at which the increase in deterioration in the in-vehicle battery 40 due to the power supply can be suppressed. For example, the control apparatus 50 sets the upper limit of the power to be supplied from the in-vehicle battery 40 to the power system 12. The control apparatus 50 restricts the power to be supplied from the in-vehicle battery 40 to the power system 12 to a value lower than or equal to the upper limit. How the power supply is controlled will be described in detail below.

The control apparatus 50 is capable of supplying the power accumulated in the in-vehicle battery 40 to the power system 12 while suppressing the increase in deterioration in the in-vehicle battery 40 by restricting the power of the power supply.

Upon connection of the charge connector 24 to the charging port 44, the control apparatus 50 performs pre-charge of the in-vehicle battery 40, as indicated by an arrow A13 in FIG. 2. The pre-charge is charge that is performed in advance before the power supply request is received. The pre-charge is different from the charge that is performed after the power supply based on the power supply request.

If the SOC in the in-vehicle battery 40 becomes higher than or equal to the predetermined SOC during the pre-charge, the control apparatus 50 terminates the pre-charge. Although the predetermined SOC is set to, for example, 100%, the predetermined SOC is not limited to this example and may be set to any value.

After the pre-charge, the control apparatus 50 is in a standby state in which the control apparatus 50 waits for the power supply request from the power system 12, as indicated by an arrow A14 in FIG. 2. Then, upon reception of the power supply request in the standby state, the control apparatus 50 starts the power supply in the above manner. The control apparatus 50 may stop the pre-charge to perform the power supply based on the power supply request when the power supply request is received during the pre-charge.

Performing the pre-charge before the power supply is started enables the control apparatus 50 to increase the total of the power to be supplied from the vehicle 14 to the power system 12 as much as possible.

Figure 3:
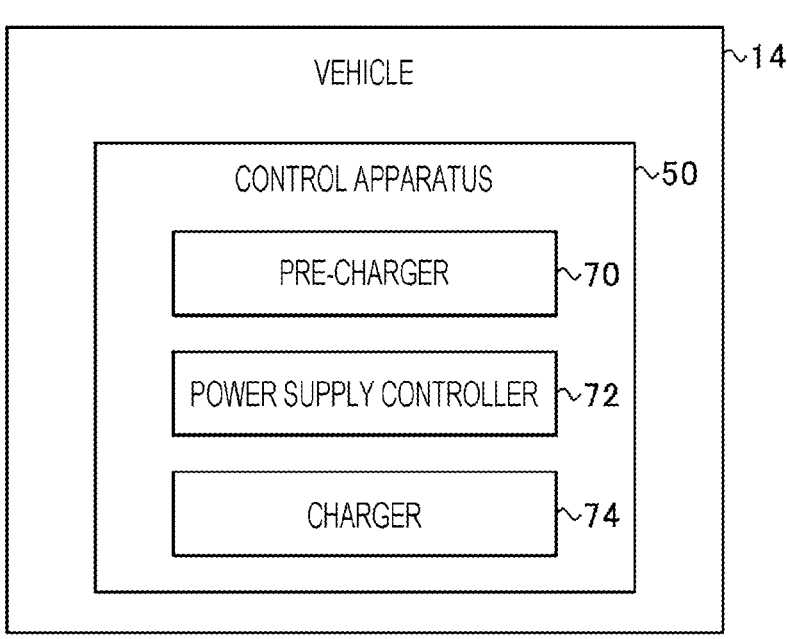
FIG. 3 is a block diagram illustrating functions of the control apparatus.

FIG. 3 is a block diagram illustrating functions of the control apparatus 50. Referring to FIG. 3, the processor 52 in the control apparatus 50 functions as a pre-charger 70, a power supply controller 72, and a charger 74 in cooperation with the programs in the memory 54 in an embodiment of the disclosure.

The pre-charger 70 performs the pre-charge upon connection of the charge connector 24 to the charging port 44. In addition, the pre-charger 70 acquires the charge end time, which is input into the vehicle 14, when the charge connector 24 is connected to the charging port 44.

The power supply controller 72 sets the charge start time based on the charge end time upon reception of the power supply request. In addition, the power supply controller 72 starts the power supply if the power supply request is received before the charge start time. The power supply controller 72 controls the power of the power supply so that the SOC in the in-vehicle battery 40 becomes lower than or equal to the power supply stop SOC. The power supply controller 72 controls the power of the power supply so as to be lower than or equal to the predetermined upper limit at which the increase in deterioration in the in-vehicle battery 40 due to the power supply can be suppressed.

The charger 74 starts the charge of the in-vehicle battery 40 when the current time reaches the charge start time. The charger 74 terminates the charge if the SOC in the in-vehicle battery 40 becomes higher than or equal to the predetermined SOC.

Figure 4:
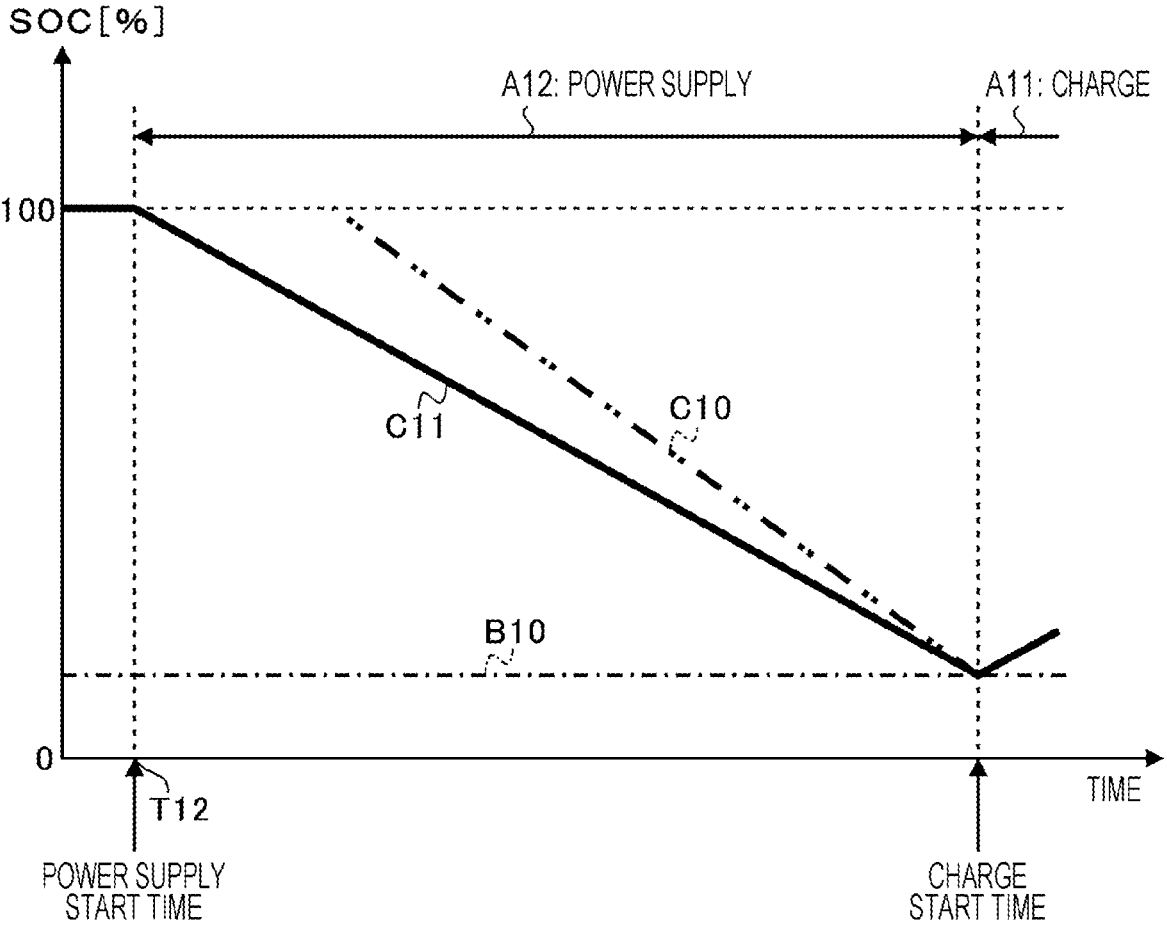
FIG. 4 is a graph for describing how the power of power supply is controlled.

FIG. 4 is a graph for describing how the power of the power supply is controlled. In the present embodiment, continuous State of Power (SOP) and first SOP are defined as indexes of the power with which the increase in deterioration in the in-vehicle battery 40 due to the power supply can be suppressed.

The continuous SOP indicates a maximum value of the power of the power supply at which the increase in deterioration in the in-vehicle battery 40 due to the power supply can be suppressed even if the power supply is continuously performed. The continuous SOP is a fixed value that is set for each in-vehicle battery 40 based on the kind or the feature of the in-vehicle battery 40. An alternate long and two short dashes line C10 in FIG. 4 indicates an example of time transition of the SOC when the power supply is performed in accordance with the continuous SOP. The continuous SOP corresponds to the slope of the alternate long and two short dashes line C10.

The first SOP indicates predetermined power that is lower than or equal to the continuous SOP. A solid line C11 in FIG. 4 indicates an example of time transition of the SOC when the power supply is performed in accordance with the first SOP.

The processor 52 in the control apparatus 50 performs a process to determine the first SOP based on the time from the reception time of the power supply request to the charge start time. The reception time of the power supply request corresponds to the power supply start time. For example, the time from the reception time of the power supply request to the charge start time is assumed to be a power supply scheduled time at which the power supply is scheduled. It is assumed that the power supply is continued in accordance with the first SOP during the power supply scheduled time. According, as indicated by the solid line C11 in FIG. 2, the first SOP corresponds to the slope during the power supply scheduled time in the time transition of the SOC.

On the above assumption, the power supply controller 72 calculates the power supply scheduled time from the reception time of the power supply request to the charge start time. The power supply controller 72 subtracts goal SOC at the charge start time from the SOC at the reception time of the power supply request to calculate power supply scheduled SOC. The goal SOC is set to a value lower than or equal to the power supply stop SOC. The power supply controller 72 divides the power supply scheduled SOC by the power supply scheduled time to calculate the first SOP.

The power supply scheduled time may be relatively shortened depending on the reception time of the power supply request. When the power supply scheduled time is short, there is a room for improvement in that the first SOP calculated from the power supply scheduled time and the power supply scheduled SOC may be higher than the continuous SOP. In such a case, the power supply controller 72 may vary the power supply stop SOC to a value higher than the predetermined power supply stop SOC. Changing the power supply stop SOC to a value higher than the predetermined power supply stop SOC enables the power supply scheduled SOC to be decreased. This enables the power supply controller 72 to set the first SOP calculated based on the power supply scheduled SOC to a value lower than or equal to the continuous SOP.

Figure 5:
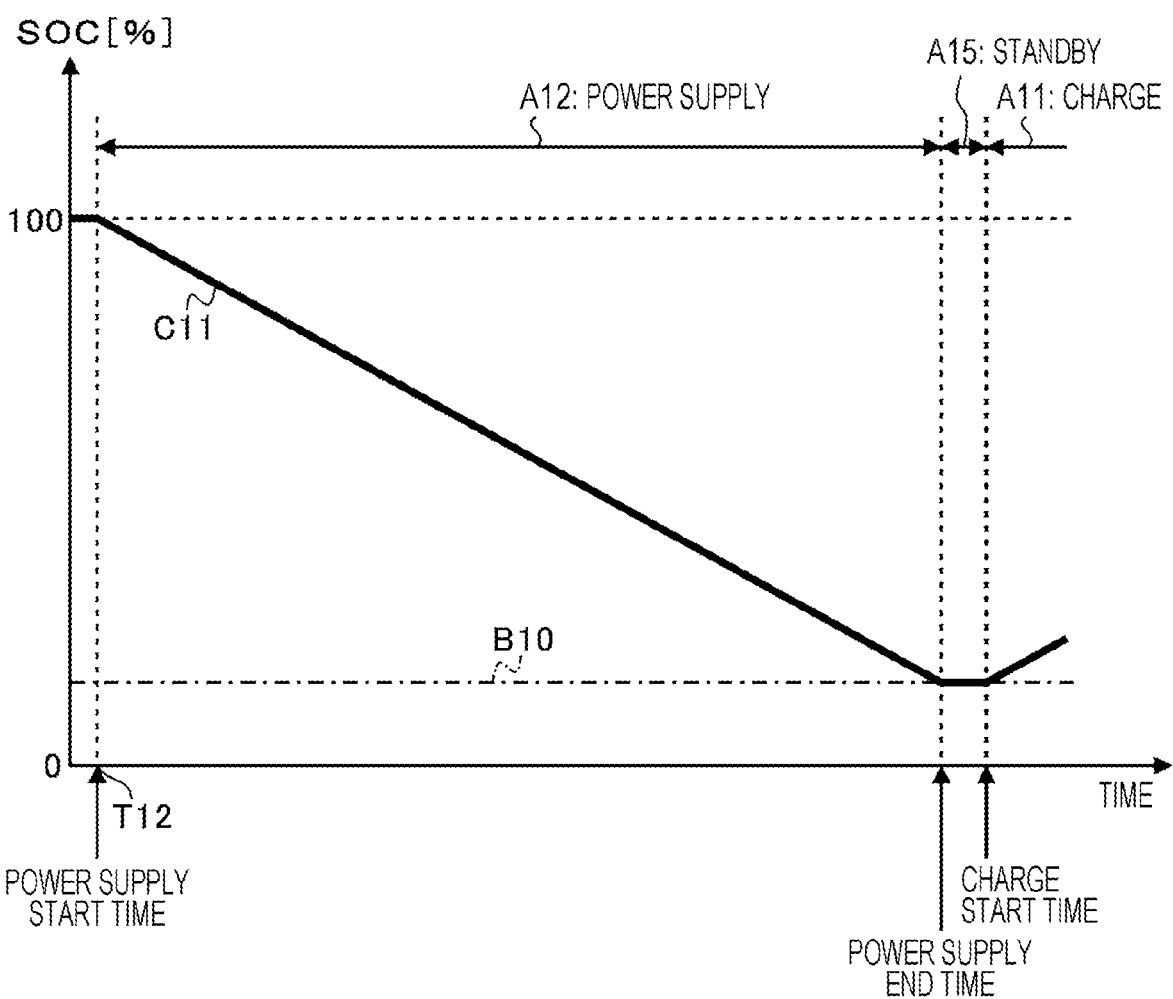
FIG. 5 is a graph for describing another example concerning calculation of first SOP.

FIG. 5 is a graph for describing another example concerning the calculation of the first SOP. The time from the reception time of the power supply request to the charge start time is set as the power supply scheduled time in the example in FIG. 4. In contrast, in the example in FIG. 5, a power supply end time is assumed between the reception time of the power supply request and the charge start time. The power supply end time indicates the time at which termination of the power supply is scheduled. The power supply scheduled time in the example in FIG. 5 is the time from the reception time of the power supply request to the power supply end time. The time from the power supply end time to the charge start time is a standby time, as indicated by an arrow A15 in FIG. 5.

The power supply controller 72 sets the power supply end time based on the charge start time. The power supply controller 72 calculates the power supply scheduled time from the reception time of the power supply request to the power supply end time. The power supply controller 72 subtracts the goal SOC at the power supply end time from the SOC at the reception time of the power supply request to calculate the power supply scheduled SOC. The goal SOC is set to a value lower than or equal to the power supply stop SOC. The power supply controller 72 divides the power supply scheduled SOC by the power supply scheduled time to calculate the first SOP.

As described above, the power supply controller 72 may set the first SOP after setting the power supply end time. This enables the SOC at the charge start time to be easily set to a value lower than or equal to the power supply stop SOC by the power supply controller 72.

Figure 6:
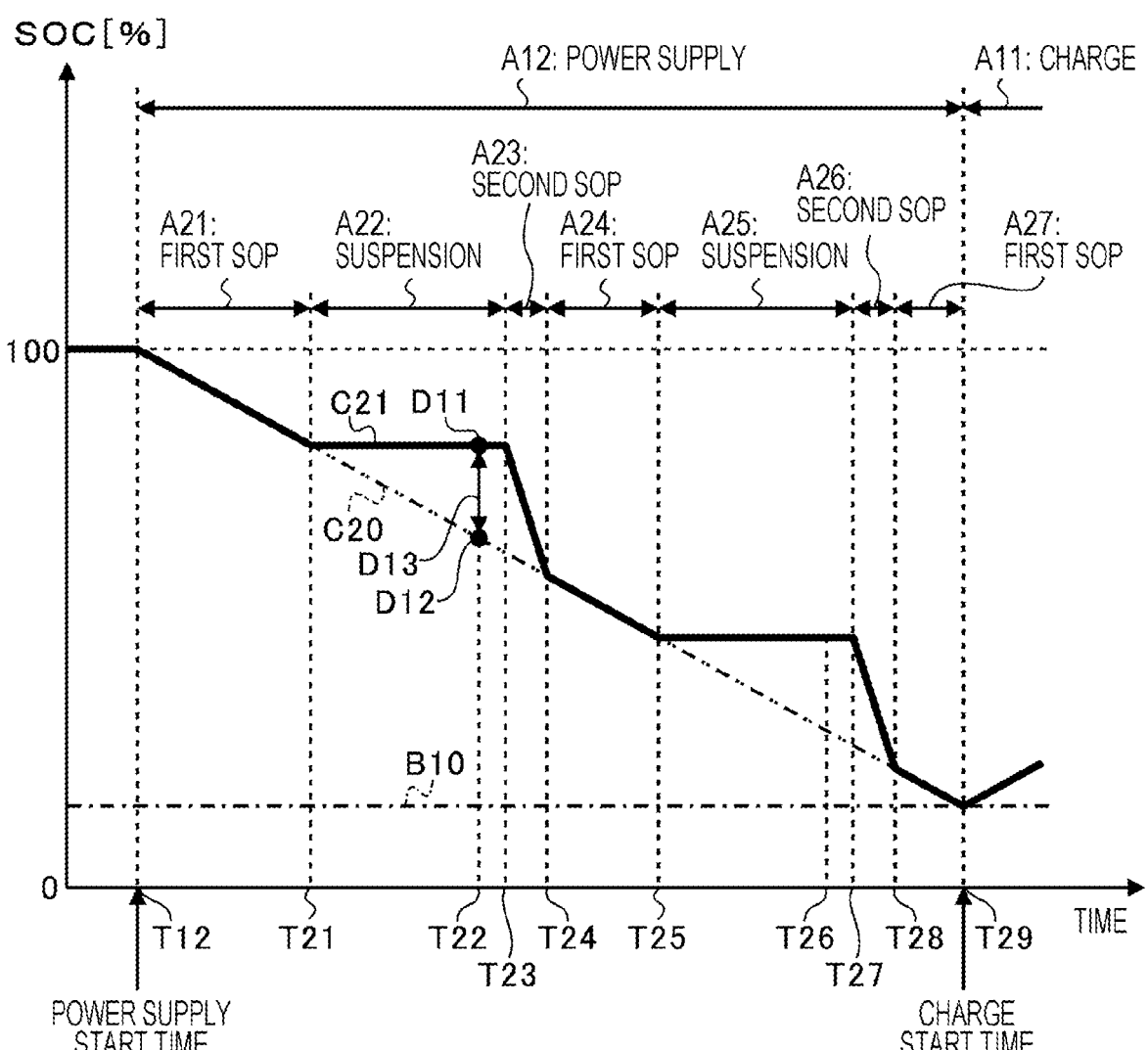
FIG. 6 is a graph for describing how the power of the power supply is controlled in detail.

FIG. 6 is a graph for describing how the power of the power supply is controlled in detail. An alternate long and two short dashes line C20 in FIG. 6 indicates the time transition of the SOC when it is assumed that the power supply in accordance with the first SOP is continued from the power supply start time. A solid line C21 in FIG. 6 indicates an example of the time transition of the actual SOC.

The demand for power is varied from time to time in the power system 12. For example, it is assumed that, after the power supply is started from the vehicle 14 to the power system 12, the demand for power in the power system 12 is decreased with respect to supply of power to the power system 12. In this case, the power system 12 is capable of meeting the demand for power with the supply of power in the power system 12 and the power from the vehicle 14 is not used. In such a case, the vehicle 14 suspends the power supply to the power system 12.

In the example in FIG. 6, it is assumed that the power supply is started at the time T12 and the power of the power supply is suppressed in accordance with the first SOP, as indicated by an arrow A21. For example, it is assumed that, at a time T21 after the time T12, the power supply is suspended, as indicated by an arrow A22. When the power supply is suspended, the SOC in the in-vehicle battery 40 is kept at the SOC when the power supply is suspended, as indicated by the solid line C21. In this case, the possibility that the SOC in the in-vehicle battery 40 does not reach a value lower than or equal to the power supply stop SOC before the charge start time is increased.

Accordingly, in the present embodiment, second SOP is further defined as an index of the power at which the increase in deterioration in the in-vehicle battery 40 due to the power supply can be suppressed.

The second SOP indicates a maximum value of the power of the power supply at which the increase in deterioration in the in-vehicle battery 40 due to the power supply can be suppressed if the power supply is performed for a short time. Although the short time is, for example, several minutes, the specific time is not limited to this example. The second SOP is higher than the continuous SOP. The second SOP is a variable value that is varied depending on the state of the in-vehicle battery 40 or the like. The power supply controller 72 calculates the second SOP based on a second SOP map. The second SOP map is stored in advance in the memory 54 in the control apparatus 50.

The second SOP map is associated with the SOC in the in-vehicle battery 40, the temperature of the in-vehicle battery 40, the time in which the power supply is performed in accordance with the second SOP, and the second SOP. For example, since the possibility of the increase in deterioration in the in-vehicle battery 40 is increased as the temperature of the in-vehicle battery 40 is increased, the second SOP map is set so that the second SOP is decreased as the temperature of the in-vehicle battery 40 is increased. In addition, since the possibility of the increase in deterioration in the in-vehicle battery 40 is increased as the SOC in the in-vehicle battery 40 is increased, the second SOP map is set so that the second SOP is decreased as the SOC in the in-vehicle battery 40 is increased. Furthermore, since the possibility of the increase in deterioration in the in-vehicle battery 40 is increased as the time of the power supply in accordance with the second SOP is increased, the second SOP map is set so that the second SOP is decreased as the time of the power supply in accordance with the second SOP is increased.

The power supply controller 72 assigns the current SOC in the in-vehicle battery 40, the current temperature of the in-vehicle battery 40, and the time of the power supply in accordance with the second SOP to the second SOP map to calculate the second SOP. The power supply controller 72 may calculate the second SOP based on at least one of the SOC in the in-vehicle battery 40, the temperature of the in-vehicle battery 40, or the time of the power supply in accordance with the second SOP.

The processor 52 in the control apparatus 50 determines during the power supply whether the SOC in the in-vehicle battery 40 reaches the power supply stop SOC before the charge start time. If the processor 52 in the control apparatus 50 determines that the SOC in the in-vehicle battery 40 reaches a value lower than or equal to the power supply stop SOC before the charge start time, the processor 52 in the control apparatus 50 performs a process to control the power of the power supply in accordance with the first SOP. If the processor 52 in the control apparatus 50 determines that the SOC in the in-vehicle battery 40 does not reach a value lower than or equal to the power supply stop SOC before the charge start time, the processor 52 in the control apparatus 50 performs a process to control the power of the power supply in accordance with the second SOP.

For example, the power supply controller 72 acquires the current actual SOC during the power supply. The power supply controller 72 calculates target SOC indicating the current SOC when it is assumed that the power supply in accordance with the first SOP is continued from the power supply start time. The power supply controller 72 determines whether the SOC in the in-vehicle battery 40 reaches the power supply stop SOC before the charge start time based on an SOC difference indicating the difference between the current actual SOC and the target SOC.

For example, it is assumed that the current time is a time T22 after the time T21. In this case, the current actual SOC is the SOC indicated by a black circle D11 in FIG. 6. The target SOC is the SOC indicated by a black circle D12 in FIG. 6. The power supply controller 72 subtracts the target SOC from the current actual SOC to calculate the SOC difference indicated by an arrow D13 in FIG. 6.

The power supply controller 72 determines that the SOC in the in-vehicle battery 40 reaches the power supply stop SOC before the charge start time if the calculated SOC difference is lower than a predetermined value. In other words, the power supply controller 72 controls the power of the power supply in accordance with the first SOP if the calculated SOC difference is lower than the predetermined value.

The power supply controller 72 determines that the SOC in the in-vehicle battery 40 does not reach the power supply stop SOC before the charge start time if the calculated SOC difference is higher than or equal to the predetermined value. In other words, the power supply controller 72 controls the power of the power supply in accordance with the second SOP if the calculated SOC difference is higher than or equal to the predetermined value. The predetermined value on which the comparison of the SOC difference is based may be set to any value.

In the example in FIG. 6, it is assumed that the SOC difference becomes higher than or equal to the predetermined value at the time T22. In this case, the power supply controller 72 sets the upper limit of the power of the power supply to the second SOP at the time T22. As a result, the power of the power supply is restricted to be lower than or equal to the second SOP after the time T22.

In the example in FIG. 6, it is assumed that a state is continued in which the supply of power to the power system 12 is greater than the demand for power until a time T23 after the time T22. In other words, the power supply is suspended until the time T23 in the example in FIG. 6. It is assumed that, at the time T23, the demand for power of the power system 12 becomes greater than the supply of power and the power supply is restarted. At this time, since the upper limit of the power of the power supply is set to the second SOP, the power of the power supply is permitted to the second SOP, which is higher than the first SOP. After the time T23, the power supply controller 72 supplies the power to the power system 12 in accordance with the second SOP, as indicated by an arrow A23 in FIG. 6.

The control of the power of the power supply in accordance with the second SOP increases the amount of decrease of the SOC per unit time, compared with the case in which the power of the power supply is controlled in accordance with the first SOP. In the control of the power of the power supply in accordance with the second SOP, the power supply controller 72 is capable of decreasing the SOC difference between the actual SOC and the target SOC. In other words, the power supply controller 72 is capable of varying the SOC in the in-vehicle battery 40 to a value lower than or equal to the power supply stop SOC before the charge start time.

The power supply controller 72 sequentially updates the second SOP using the second SOP map in the control of the power of the power supply in accordance with the second SOP. This enables the increase in deterioration in the in-vehicle battery 40 to be appropriately suppressed by the power supply controller 72.

In the example in FIG. 6, it is assumed that the SOC difference between the actual SOC and the target SOC becomes lower than the predetermined value at a time T24 after the time T23. In this case, the power supply controller 72 controls the power of the power supply in accordance with the first SOP after the time T24, as indicated by an arrow A24 in FIG. 6.

It is assumed that the power supply is suspended at a time T25 after the time T24, as indicated by an arrow A25 in FIG. 6. It is assumed that, at a time T26 after the time T25, the SOC difference between the actual SOC and the target SOC becomes greater than or equal to the predetermined value. The power supply controller 72 sets the upper limit of the power of the power supply to the second SOP at the time T26. It is assumed that, at a time T27 after the time T26, the power supply is restarted. The power supply controller 72 controls the power of the power supply in accordance with the second SOP after the time T27, as indicated by an arrow A26 in FIG. 6. It is assumed that, at a time T28 after the time T27, the SOC difference between the actual SOC and the target SOC becomes lower than the predetermined value. The power supply controller 72 controls the power of the power supply in accordance with the first SOP after the time T28, as indicated by an arrow A27 in FIG. 6. Then, the SOC in the in-vehicle battery 40 reaches the power supply stop SOC and, at a time T29, the charge is started.

The power supply controller 72 is capable of appropriately performing the power supply while suppressing the increase in deterioration in the in-vehicle battery 40 by switching between the power supply in accordance with the first SOP and the power supply in accordance with the second SOP.

Figure 7:
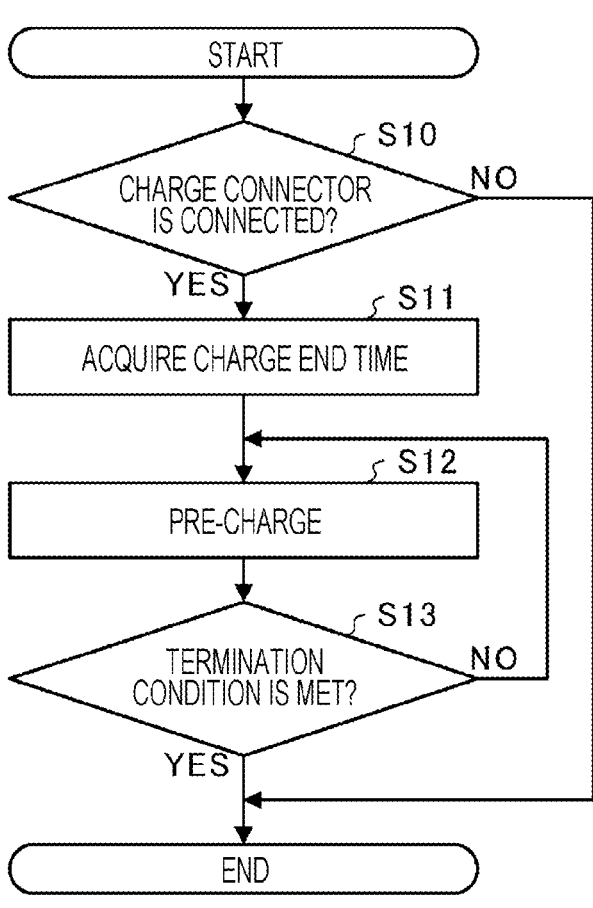
FIG. 7 is a flowchart describing an operational flow of a pre-charger.

FIG. 7 is a flowchart describing an operational flow of the pre-charger 70. The pre-charger 70 repetitively performs a series of steps in FIG. 7 at every predetermined interruption timing occurring with a predetermined control period.

Referring to FIG. 7, in S10, the pre-charger 70 determines whether the charge connector 24 is connected to the charging port 44. If the charge connector 24 is not connected to the charging port 44 (NO in S10), the series of steps in FIG. 7 are terminated.

The owner of the vehicle 14 connects the charge connector 24 to the charging port 44 and inputs the charge end time into the vehicle 14 in the charge of the in-vehicle battery 40.

If the charge connector 24 is connected to the charging port 44 (YES in S10), in S11, the pre-charger 70 acquires the charge end time that is input into the vehicle 14. In S12, the pre-charger 70 starts the pre-charge. For example, the pre-charger 70 turns on the switch in the control BOX 42 to electrically connect the charging port 44 to the in-vehicle battery 40. The pre-charger 70 communicates with the power supply facility 10 to control the power conversion apparatus 20 via the control apparatus 30 in the power supply facility 10 and makes the voltage at the terminal connected to the in-vehicle battery 40 in the control BOX 42 higher than the voltage at the input-output terminal of the in-vehicle battery 40. Then, the pre-charger 70 causes the power supply facility 10 to start the supply of the power to the vehicle 14.

In S13, the pre-charger 70 determines whether a predetermined termination condition is met. If the predetermined termination condition is not met (NO in S13), the operational flow goes back to S12 and the pre-charger 70 continuously performs the pre-charge until the predetermined termination condition is met. The predetermined termination condition is, for example, the SOC in the in-vehicle battery 40, which reaches 100%. The predetermined termination condition is not limited to this example and may be set to any value. Alternatively, the predetermined termination condition may be reception of the power supply request. If the predetermined termination condition is met (YES in S13), the series of steps in FIG. 7 are terminated.

Figure 8:
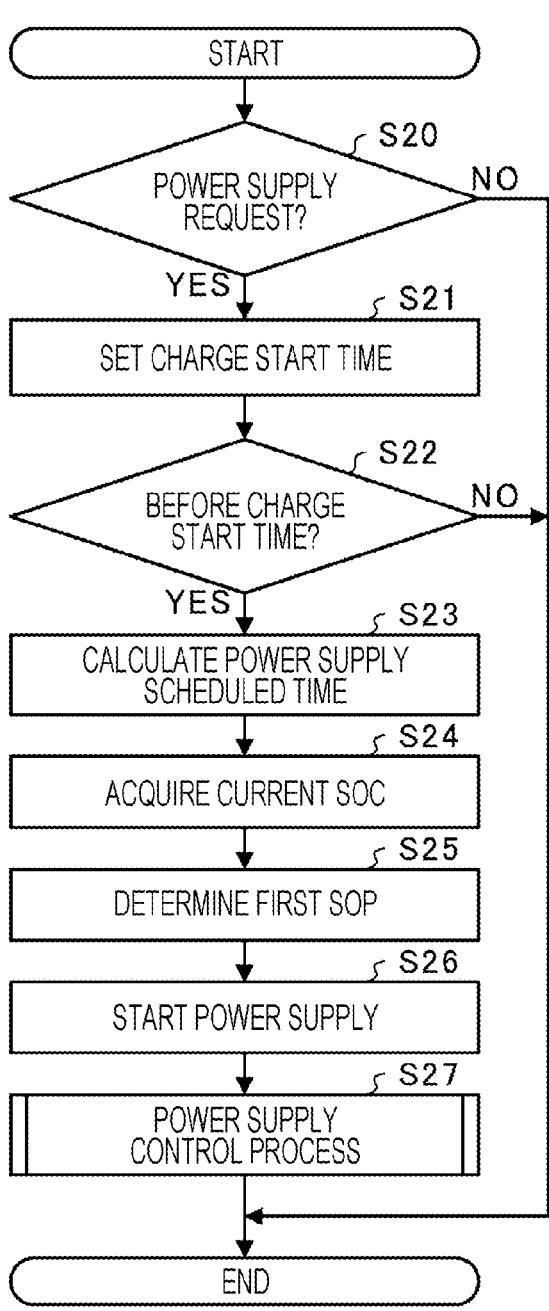
FIG. 8 is a flowchart describing an operational flow of a power supply controller.

FIG. 8 is a flowchart describing an operational flow of the power supply controller 72. The power supply controller 72 repetitively performs a series of steps in FIG. 8 at every predetermined interruption timing occurring with a predetermined control period.

Referring to FIG. 8, in S20, the power supply controller 72 determines whether the power supply request is received. If the power supply request is not received (NO in S20), the series of steps in FIG. 8 are terminated. If the power supply request is received (YES in S20), the power supply controller 72 performs S21 and the subsequent steps.

In S21, the power supply controller 72 sets the charge start time based on the charge end time. For example, the power supply controller 72 sets the charge start time at which the SOC in the in-vehicle battery 40 is capable of being increased from the power supply stop SOC to a predetermined value or higher. Although the predetermined value here is, for example, 100%, the predetermined value is not limited to this example and may be set to any value.

In S22, the power supply controller 72 determines whether the power supply request is received before the charge start time. If the power supply request is received after the charge start time (NO in S22), the series of steps in FIG. 8 are terminated. In this case, the power supply is not performed.

If the power supply request is received before the charge start time (YES in S22), in S23, the power supply controller 72 calculates the power supply scheduled time based on the reception time of the power supply request and the charge start time.

In S24, the power supply controller 72 acquires the current SOC based on the voltage of the in-vehicle battery 40, which is detected by the voltage sensor 60.

In S25, the power supply controller 72 determines the first SOP based on the current SOC, the power supply stop SOC, and the power supply scheduled time.

In S26, the power supply controller 72 starts the power supply with the maximum value of the power to be supplied from the vehicle 14 to the power system 12 being restricted to the first SOP. In S27, the power supply controller 72 performs a power supply control process to control the voltage of the power supply until the power supply termination condition is met. The power supply control process will be described in detail below.

Figure 9:
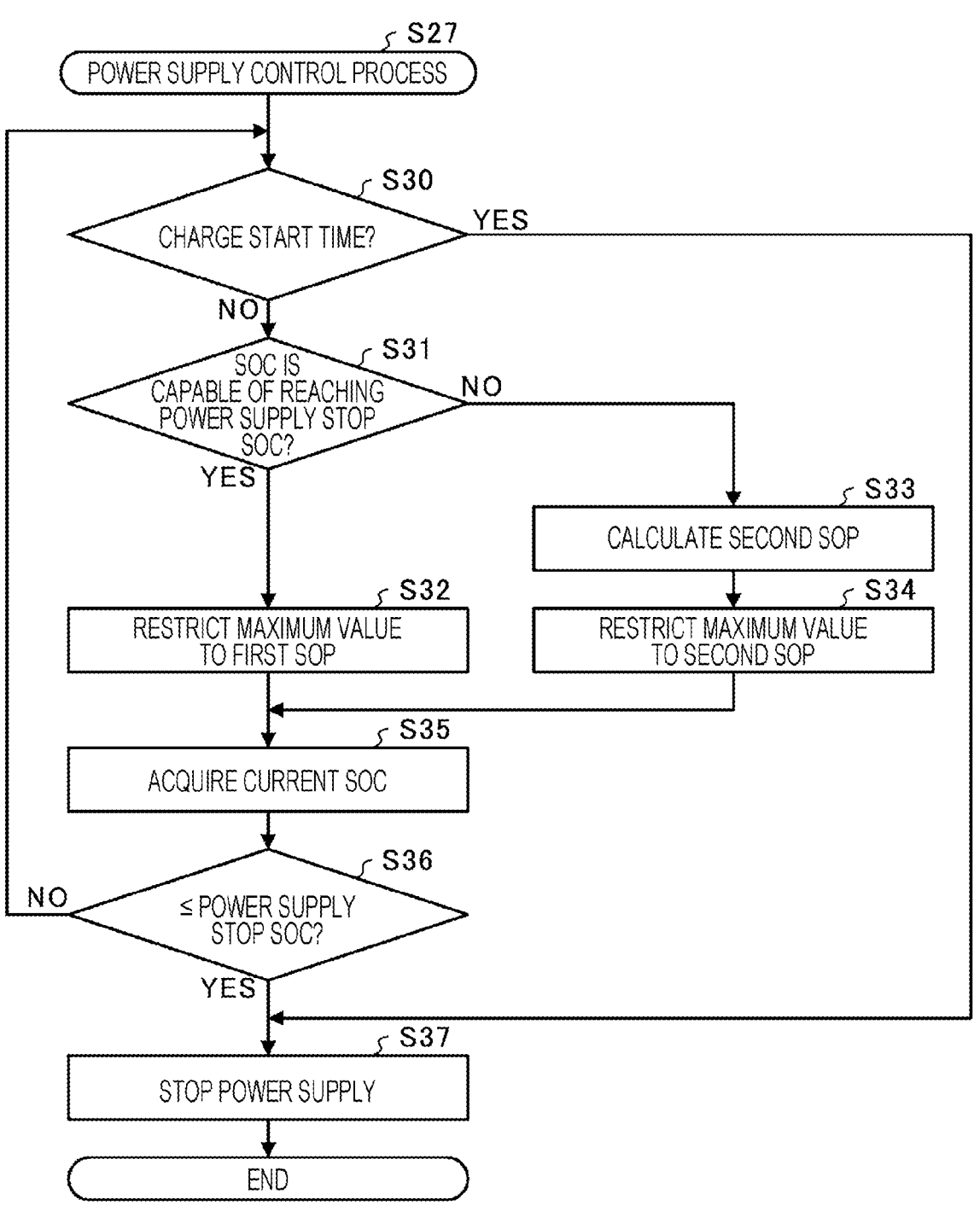
FIG. 9 is a flowchart describing a power supply control process in detail.

FIG. 9 is a flowchart describing the power supply control process (S27) in detail. In the power supply control process, in S30, the power supply controller 72 determines whether the current time reaches the charge start time.

If the current time does not reach the charge start time (NO in S30), in S31, the power supply controller 72 determines whether the SOC is capable of reaching the power supply stop SOC before the charge start time. For example, the power supply controller 72 acquires the current SOC based on the voltage of the in-vehicle battery 40, which is detected by the voltage sensor 60. The power supply controller 72 calculates the current target SOC based on the SOC at the power supply start time and the first SOP. The power supply controller 72 subtract the target SOC from the current SOC to calculate the SOC difference. If the SOC difference is smaller than a predetermined value, the power supply controller 72 determines that the SOC is capable of reaching the power supply stop SOC before the charge start time.

If the SOC is capable of reaching the power supply stop SOC before the charge start time (YES in S31), in S32, the power supply controller 72 restricts the maximum value of the power to be supplied from the vehicle 14 to the power system 12 to the first SOP. Then, the operational flow goes to S35. In other words, the power supply controller 72 controls the power supply in accordance with the first SOP.

If the SOC is not capable of reaching the power supply stop SOC before the charge start time (NO in S31), in S33, the power supply controller 72 calculates the second SOP. For example, the power supply controller 72 acquires the current SOC based on the voltage of the in-vehicle battery 40, which is detected by the voltage sensor 60. The power supply controller 72 acquires the current temperature of the in-vehicle battery 40, which is detected by the temperature sensor 62. The power supply controller 72 acquires the time in which the power supply in accordance with the second SOP is performed.

The power supply controller 72 assigns the current SOC in the in-vehicle battery 40, the current temperature of the in-vehicle battery 40, and the time of the power supply in accordance with the second SOP to the second SOP map to calculate the second SOP. In S34, the power supply controller 72 restricts the maximum value of the power to be supplied from the vehicle 14 to the power system 12 to the second SOP. Then, the operational flow goes to S35.

In S35, the power supply controller 72 acquires the current SOC based on the voltage of the in-vehicle battery 40, which is detected by the voltage sensor 60.

In S36, the power supply controller 72 determines whether the current SOC is lower than or equal to the power supply stop SOC. If the current SOC is higher than the power supply stop SOC (NO in S36), the operational flow goes back to S30 and the power supply controller 72 repeats S30 and the subsequent steps.

If the current time reaches the charge start time (YES in S30), in S37, the power supply controller 72 stops the power supply. Then, the series of steps in FIG. 9 are terminated. In this case, since the current time reaches the charge start time before the SOC in the in-vehicle battery 40 is decreased to the power supply stop SOC, the power supply is stopped and the charge is started.

If the current SOC is lower than or equal to the power supply stop SOC (YES in S36), in S37, the power supply controller 72 stops the power supply. Then, the series of steps in FIG. 9 are terminated. In this case, the control apparatus 50 is in the standby state until the current time reaches the charge start time.

As described above, the control apparatus 50 in the vehicle 14 of the present embodiment controls the power of the power supply so as to be lower than or equal to the predetermined upper limit at which the increase in deterioration in the in-vehicle battery 40 due to the power supply can be suppressed. Since this restricts the power of the power supply to the power system 12 in the vehicle 14 of the present embodiment, it is possible to suppress the increase in deterioration in the in-vehicle battery 40 due to the power supply.

Accordingly, with the vehicle 14 of the present embodiment, it is possible to supply the power accumulated in the in-vehicle battery 40 to the power system 12 while suppressing the increase in deterioration in the in-vehicle battery 40.

Although the embodiments of the disclosure are described with reference to the attached drawings, the disclosure is not limited the embodiments. It is obvious to the person skilled in the art that various changes or modifications are available within the scope of the appended claims and such changes and modifications are also included in the technical scope of the disclosure.

The control apparatus 50 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control apparatus 50 including the pre-charger 70, the power supply controller 72, and the charger 74. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:
1. A vehicle comprising:
a charging port configured to be electrically connectable to a power system; an in-vehicle battery configured to electrically connect to the power system via the charging port; and
a control apparatus including one or more processors and one or more non-transitory memories configured to be connected to the processors,
the control apparatus is configured to:
control charge of the in-vehicle battery with power supplied from the power system, and
control a power supply in response to reception of a power supply request requesting the power supply to supply power accumulated in the in-vehicle battery to the power system, wherein the one or more processors is configured to, in cooperation with a program included in the one or more non-transitory memories,
start supplying power from the in-vehicle battery to the power system in a case where the power supply request is received before a charge start time at which start of the charge from the power system to the in-vehicle battery is scheduled based on a time at which termination of the charge of the in-vehicle battery is scheduled, and
supply power from the in-vehicle battery to the power system at a first rate until a state of charge (SOC) in the in-vehicle battery becomes from a first SOC at a time when the control apparatus starts supplying power from the in-vehicle battery to the power system, to a second SOC that is lower than or equal to the first SOC by a predetermined value before the charge start time,
the first rate at which an increase in deterioration in the in-vehicle battery due to the power supply is suppressed when the power supply is continuously performed, wherein
the control apparatus is configured to supply power from the in-vehicle battery to the power system by using a second rate when detecting possibility that a SOC in the in-vehicle battery does not reach the second SOC before the charge start time, the second rate being a maximum value of the power of the power supply at which the increase in deterioration in the in-vehicle battery due to the power supply is suppressed when the power supply is performed for a short time, wherein a maximum value of the power of the power supply, at which the increase in deterioration in the in-vehicle battery due to the power supply can be suppressed even in a case where the power supply is continuously performed, is defined as a continuous state of power, wherein predetermined power that is lower than or equal to the continuous state of power is defined as first state of power, and wherein a maximum value of the power of the power supply which is higher than the continuous state of power and at which the increase in deterioration in the in-vehicle battery due to the power supply can be suppressed in a case where the power supply is performed for a short time, is defined as second state of power, and wherein the control apparatus is further configured to control the power of the power supply in accordance with the first state of power, in a case where it is determined that the state of charge in the in-vehicle battery becomes the predetermined threshold value or lower before the charge start time during the power supply, and control the power of the power supply in accordance with the second state of power, in a case where it is determined that the state of charge in the in-vehicle battery does not become the predetermined threshold value or lower before the charge start time during the power supply, wherein a difference between a current actual state of charge in the in-vehicle battery and a target state of charge on an assumption that the power supply in accordance with the first state of power is continuously performed from a power supply start time at which the power supply is started is defined as a state of charge difference, and wherein the control apparatus is further configured to control the power of the power supply in accordance with the first state of power, in a case where the state of charge difference is lower than a predetermined value during the power supply, and control the power of the power supply in accordance with the second state of power, in a case where the state of charge difference is higher than or equal to the predetermined value during the power supply, wherein the control apparatus is further configured to sequentially update the second state of power based on the state of charge in the in-vehicle battery; a temperature of the in-vehicle battery; and a time during which the power supply is performed in accordance with the second state of power.

2. The vehicle according to claim 1,
wherein the control apparatus is further configured to
determine the first state of power based on a time from the reception time of the power supply request to the charge start time.

3. The vehicle according to claim 1, wherein the one or more processors restrict the state of charge in the in-vehicle battery to lower than or equal to the predetermined value before the charge start time and restrict the power supply to be lower than or equal to a predetermined upper limit.

4. A non-transitory computer readable medium comprising a program, the program executable by a control apparatus including one or more processors, the program comprising:

controlling charge of an in-vehicle battery with power supplied from the power system, and to control a power supply in response to reception of a power supply request requesting the power supply to supply power accumulated in the in-vehicle battery to the power system;

start supplying power from the in-vehicle battery to the power system in a case where the power supply request is received before a charge start time at which start of the charge from the power system to the in-vehicle battery is scheduled based on a time at which termination of the charge of the in-vehicle battery is scheduled;

supplying power from the in-vehicle battery to the power system at a first rate until a state of charge (SOC) in the in-vehicle battery becomes from a first SOC at a time when the control apparatus starts supplying power from the in-vehicle battery to the power system, to a second SOC that is lower than or equal to the first SOC by a predetermined value before the charge start time, the first rate at which an increase in deterioration in the in-vehicle battery due to the power supply is suppressed when the power supply is continuously performed; and supplying power from the in-vehicle battery to the power system by using a second rate when detecting possibility that a SOC in the in-vehicle battery does not reach the second SOC before the charge start time, wherein the second rate being a maximum value of the power of the power supply at which the increase in deterioration in the in-vehicle battery due to the power supply is suppressed when the power supply is performed for a short time, wherein a maximum value of the power of the power supply, at which the increase in deterioration in the in-vehicle battery due to the power supply can be suppressed even in a case where the power supply is continuously performed, is defined as a continuous state of power, wherein predetermined power that is lower than or equal to the continuous state of power is defined as first state of power, and wherein a maximum value of the power of the power supply which is higher than the continuous state of power and at which the increase in deterioration in the in-vehicle battery due to the power supply can be suppressed in a case where the power supply is performed for a short time, is defined as second state of power, and further comprising controlling the power of the power supply in accordance with the first state of power, in a case where it is determined that the state of charge in the in-vehicle battery becomes the predetermined threshold value or lower before the charge start time during the power supply; and controlling the power of the power supply in accordance with the second state of power, in a case where it is determined that the state of charge in the in-vehicle battery does not become the predetermined threshold value or lower before the charge start time during the power supply, wherein a difference between a current actual state of charge in the in-vehicle battery and a target state of charge on an assumption that the power supply in accordance with the first state of power is continuously performed from a power supply start time at which the power supply is started is defined as a state of charge difference, and further comprising controlling the power of the power supply in accordance with the first state of power, in a case where the state of charge difference is lower than a predetermined value during the power supply; and controlling the power of the power supply in accordance with the second state of power, in a case where the state of charge difference is higher than or equal to the predetermined value during the power supply, further comprising of power based on the state of charge in the in-vehicle battery; a temperature of the in-vehicle battery; and a time during which the power supply is performed in accordance with the second state of power.

5. The non-transitory computer readable medium according to claim 4, further comprising determining the first state of power based on a time from the reception time of the power supply request to the charge start time.

6. The non-transitory computer readable medium according to claim 4, further comprising restricting the state of charge in the in-vehicle battery to lower than or equal to the predetermined value before the charge start time and restrict the power of the power supply to be lower than or equal to a predetermined upper limit.

\* \* \* \* \*